US007002761B1

(12) United States Patent
Sutardja et al.

(10) Patent No.: US 7,002,761 B1
(45) Date of Patent: Feb. 21, 2006

(54) DEMODULATION COMPENSATION FOR SPIRAL SERVO TRACKS IN HARD DISK DRIVES

(75) Inventors: Pantas Sutardja, San Jose, CA (US); Ke Han, Fremont, CA (US)

(73) Assignee: Marvell International Ltd., Hamilton (BM)

( * ) Notice: Subject to any disclaimer, the term of this patent is extended or adjusted under 35 U.S.C. 154(b) by 337 days.

(21) Appl. No.: 10/644,166

(22) Filed: Aug. 20, 2003

Related U.S. Application Data

(60) Provisional application No. 60/458,358, filed on Mar. 27, 2003.

(51) Int. Cl.
*G11B 20/06* (2006.01)
(52) U.S. Cl. .......................................... 360/29; 360/39
(58) Field of Classification Search ................. 360/46, 360/26, 27, 28, 53, 51, 48, 17, 75, 77.08, 360/77.06; 369/44.26, 59.21; 714/746
See application file for complete search history.

(56) References Cited

U.S. PATENT DOCUMENTS

| | | | | |
|---|---|---|---|---|
| 5,526,200 A | * | 6/1996 | Yada ............................ 360/51 |
| 5,574,706 A | * | 11/1996 | Verboom et al. ......... 369/44.26 |
| 5,615,065 A | * | 3/1997 | Cheung ................... 360/77.08 |
| 5,668,679 A | * | 9/1997 | Swearingen et al. .......... 360/75 |
| 5,892,632 A | * | 4/1999 | Behrens et al. ................ 360/51 |
| 5,961,658 A | * | 10/1999 | Reed et al. .................. 714/746 |
| 6,304,407 B1 | * | 10/2001 | Baker et al. .................... 360/75 |
| 6,324,030 B1 | * | 11/2001 | Cheung et al. .......... 360/77.08 |
| 6,344,942 B1 | | 2/2002 | Yarmchuk |
| 6,366,418 B1 | * | 4/2002 | McEwen et al. ............... 360/48 |
| 6,392,834 B1 | | 5/2002 | Ellis |
| 6,429,989 B1 | | 8/2002 | Schultz et al. |
| 6,519,107 B1 | | 2/2003 | Ehrlich et al. |
| 6,529,460 B1 | * | 3/2003 | Belser ...................... 369/59.21 |
| 6,674,593 B1 | * | 1/2004 | Jolly et al. .................... 360/51 |
| 6,738,205 B1 | * | 5/2004 | Moran et al. .................. 360/17 |
| 6,924,960 B1 | * | 8/2005 | Melkote et al. .......... 360/77.06 |
| 2002/0135927 A1 | | 9/2002 | Yatsu |

* cited by examiner

*Primary Examiner*—David Hudspeth
*Assistant Examiner*—Fred F. Tzeng

(57) ABSTRACT

A hard disk drive, and method and computer program therefor, comprising a hard disk having one or more spiral servo tracks written thereon, wherein each of the servo tracks comprises servo data comprising one or more synchronization symbols; a head adapted to produce a waveform as the head moves across the servo track; a sampler adapted to obtain a plurality of samples of the waveform, wherein the plurality of samples of the waveform comprises one of the synchronization symbols; and a processor adapted to determine an estimated location of a peak amplitude of the waveform with respect to the plurality of samples of the waveform, determine a sampling phase defined by a number of the samples between one of the synchronization symbols and a predetermined one of the samples of the waveform, determine a compensation amount based on a compensation curve and the sampling phase, determine a refined estimated location of the peak amplitude of the waveform based on the estimated location of the peak amplitude of the waveform and the compensation amount, and determine the location of the center of the servo track based on the refined estimated location of the peak amplitude of the waveform.

42 Claims, 13 Drawing Sheets

DEMODULATION COMPENSATION FOR SPIRAL SERVO TRACKS IN HARD DISK DRIVES

CROSS-REFERENCE TO RELATED APPLICATIONS

This application claims the benefit of U.S. Provisional Patent Application Ser. No. 60/458,358 entitled "Demodulation Compensation For Spiral Servo," filed Mar. 27, 2003, the disclosure thereof incorporated by reference herein in its entirety.

BACKGROUND

The present invention relates generally to servo writing recording media disks. More particularly, the present invention relates to self-servo writing recording media disks having spiral servo tracks recorded thereupon.

Computer hard disk drives employ electromagnetic read/write heads to write and read data on the magnetic layers of one or more rotating disks. The data is stored on concentric data tracks on the disk surface. To guarantee the quality of the information saved on and read back from the disk, it is important to position the head at the center of the data track during both writing and reading. A closed-loop servo system is often used to accurately position the head on the data track using servo information embedded in a dedicated portion of each data track.

For such a servo system to operate properly, the servo information must be written to the data tracks with great position accuracy. Often the servo information is written on each surface as a set of spokes or wedges extending radially from the inner diameter of each disk. The portion of a servo wedge on each data track contains a sync field, an index mark, a gray-coded track number, and two or more fine-positioned offset bursts configured in an echelon across the data track. Head position relative to the center of a data track can be determined and corrected, if necessary, by reading and noting the respective amplitudes and timings of these offset bursts.

Traditionally, a machine called a "servo writer" is used to write the servo information to the disk. A servo writer includes a massive granite base to minimize the effects of vibration, precision fixtures to hold the disk drive, a precision laser interferometer-based actuator mechanism to place the head radially with respect to the axis of rotation of the disks in the drive, and an external clock head to position the servo wedges in time. These features cause present servo writers to be extremely large and expensive. And as the density of the tracks on the disk increases, the time required by the servo writer to write the servo data to the disk also increases, which can create a bottleneck in the disk drive manufacturing process at the servo writer. Because the time that a disk drive is being servo written is expensive, it is desirable to reduce the length of this costly process.

To reduce the time required by the servo writer, techniques called "self-servo writing" have been developed. A disk produced by one such technique, called "spiral servo," is shown in FIG. 1. Instead of slowly writing the servo information to each concentric data track on each surface of each disk in a hard drive, the servo writer writes only a limited and much smaller number of spiral "servo tracks" (ST) having a known data pattern from the outer diameter (OD) to the inner diameter (ID) on only one surface of one of the disks by moving the head from OD to ID at a constant rate while the disk is spinning at a constant rate.

Then, without the aid of the servo writer, the hard disk drive uses timing information in the spiral servo tracks to determine the radial and circumferential position of the head, and writes conventional servo data to concentric data tracks on the disks using the hard drive's internal read/write head and servo system. Since the servo writer is used only to write the spiral servo tracks, the amount of servo-writing time on the servo writer is greatly reduced. The pattern on the disk surface after self servo writing is given in FIG. 2. The diagonal tracks are the residual spiral servo tracks ST, and the vertical strips represent the conventional servo spokes (SS). Once the self servo writing is finished, the spiral tracks are no longer needed, and can be overwritten by data tracks.

SUMMARY

In general, in one aspect, the invention features a hard disk drive comprising a hard disk having one or more spiral servo tracks written thereon, wherein each of the servo tracks comprises servo data comprising one or more synchronization symbols; a head adapted to produce a waveform as the head moves across the servo track; a sampler adapted to obtain a plurality of samples of the waveform, wherein the plurality of samples of the waveform comprises one of the synchronization symbols; and a processor adapted to determine an estimated location of a peak amplitude of the waveform with respect to the plurality of samples of the waveform, determine a sampling phase defined by a number of the samples between one of the synchronization symbols and a predetermined one of the samples of the waveform, determine a compensation amount based on a compensation curve and the sampling phase, determine a refined estimated location of the peak amplitude of the waveform based on the estimated location of the peak amplitude of the waveform and the compensation amount, and determine the location of the center of the servo track based on the refined estimated location of the peak amplitude of the waveform.

Particular implementations can include one or more of the following features. The processor is further adapted to determine an offset defined by a number of the samples of the waveform between the estimated location of the peak amplitude of the waveform and a second predetermined one of the samples; and select as the compensation curve one of a plurality of candidate compensation curves based on the offset. The sampler is further adapted to obtain a window of the samples of the waveform from the hard disk, wherein the window comprises n frames each comprising m of the samples of the waveform, and wherein the m samples of the waveform within at least one of the n frames comprises the one of the synchronization symbols. The processor is further adapted to determine the estimated location of a peak amplitude of the waveform with respect to the window of the samples. The processor is further adapted to determine a sampling phase defined by a number of the samples between the one of the synchronization symbols and the start of the one of the n frames comprising the one of the synchronization symbols. Implementations comprise a head controller adapted to cause the head to write further servo data to the hard disk at a location based on the determined location of the center of the servo track. The processor is further adapted to compute a demodulation value of the samples within each frame; integrate the demodulation values; select the integrated demodulation value having a value that is one-half of the value of the largest integrated demodulation value; select the sample corresponding to the selected integrated demodulation value; and determine the estimated location of a peak amplitude of the waveform based on the selected sample.

In general, in one aspect, the invention features an apparatus for determining the location of the center of a servo track embodied in a recording medium, wherein the servo track comprises servo data comprising one or more synchronization symbols, the apparatus comprising a sampler adapted to obtain a plurality of samples of a waveform produced as a head moves across the servo track, wherein the plurality of samples of the waveform comprises one of the synchronization symbols; and a processor adapted to determine an estimated location of a peak amplitude of the waveform with respect to the plurality of samples of the waveform, determine a sampling phase defined by a number of the samples between one of the synchronization symbols and a predetermined one of the samples of the waveform, determine a compensation amount based on a compensation curve and the sampling phase, determine a refined estimated location of the peak amplitude of the waveform based on the estimated location of the peak amplitude of the waveform and the compensation amount, and determine the location of the center of the servo track based on the refined estimated location of the peak amplitude of the waveform.

Particular implementations can include one or more of the following features. The processor is further adapted to determine an offset defined by a number of the samples of the waveform between the estimated location of the peak amplitude of the waveform and a second predetermined one of the samples; and select as the compensation curve one of a plurality of candidate compensation curves based on the offset. The sampler is further adapted to obtain a window of the samples of the waveform from the recording medium, wherein the window comprises n frames each comprising m of the samples of the waveform, and wherein the m samples of the waveform within at least one of the n frames comprises the one of the synchronization symbols. The processor is further adapted to determine the estimated location of a peak amplitude of the waveform with respect to the window of the samples. The processor is further adapted to determine a sampling phase defined by a number of the samples between the one of the synchronization symbols and the start of the one of the n frames comprising the one of the synchronization symbols. Implementations comprise a head controller adapted to cause the head to write further servo data to the recording medium at a location based on the determined location of the center of the servo track. The processor is further adapted to compute a demodulation value of the samples within each frame; integrate the demodulation values; select the integrated demodulation value having a value that is one-half of the value of the largest integrated demodulation value; select the sample corresponding to the selected integrated demodulation value; and determine the estimated location of a peak amplitude of the waveform based on the selected sample.

In general, in one aspect, the invention features a method and computer program for determining the location of the center of a servo track embodied in a recording medium, wherein the servo track comprises servo data comprising one or more synchronization symbols, and wherein a waveform is produced in a head as the head moves across the servo track. It comprises obtaining a plurality of samples of the waveform, wherein the plurality of samples of the waveform comprises one of the synchronization symbols; determining an estimated location of a peak amplitude of the waveform with respect to the plurality of samples of the waveform; determining a sampling phase defined by a number of the samples between one of the synchronization symbols and a predetermined one of the samples of the waveform; determining a compensation amount based on a compensation curve and the sampling phase; determining a refined estimated location of the peak amplitude of the waveform based on the estimated location of the peak amplitude of the waveform and the compensation amount; and determining the location of the center of the servo track based on the refined estimated location of the peak amplitude of the waveform.

Particular implementations can include one or more of the following features. Implementations comprise determining an offset defined by a number of the samples of the waveform between the estimated location of the peak amplitude of the waveform and a second predetermined one of the samples; and selecting as the compensation curve one of a plurality of candidate compensation curves based on the offset. Obtaining a plurality of samples of the waveform comprises obtaining a window of the samples of the waveform from the recording medium, wherein the window comprises n frames each comprising m of the samples of the waveform, and wherein the m samples of the waveform within at least one of the n frames comprises the one of the synchronization symbols. Determining an estimated location of a peak amplitude of the waveform comprises determining the estimated location of a peak amplitude of the waveform with respect to the window of the samples. Determining a sampling phase comprises determining a sampling phase defined by a number of the samples between the one of the synchronization symbols and the start of the one of the n frames comprising the one of the synchronization symbols. Implementations comprise writing further servo data to the recording medium at a location based on the determined location of the center of the servo track. Determining an estimated location of the peak amplitude of the waveform comprises computing a demodulation value of the samples within each frame; integrating the demodulation values; selecting the integrated demodulation value having a value that is one-half of the value of the largest integrated demodulation value; selecting the sample corresponding to the selected integrated demodulation value; and determining the estimated location of a peak amplitude of the waveform based on the selected sample.

The details of one or more implementations are set forth in the accompanying drawings and the description below. Other features will be apparent from the description and drawings, and from the claims.

Figure 1:
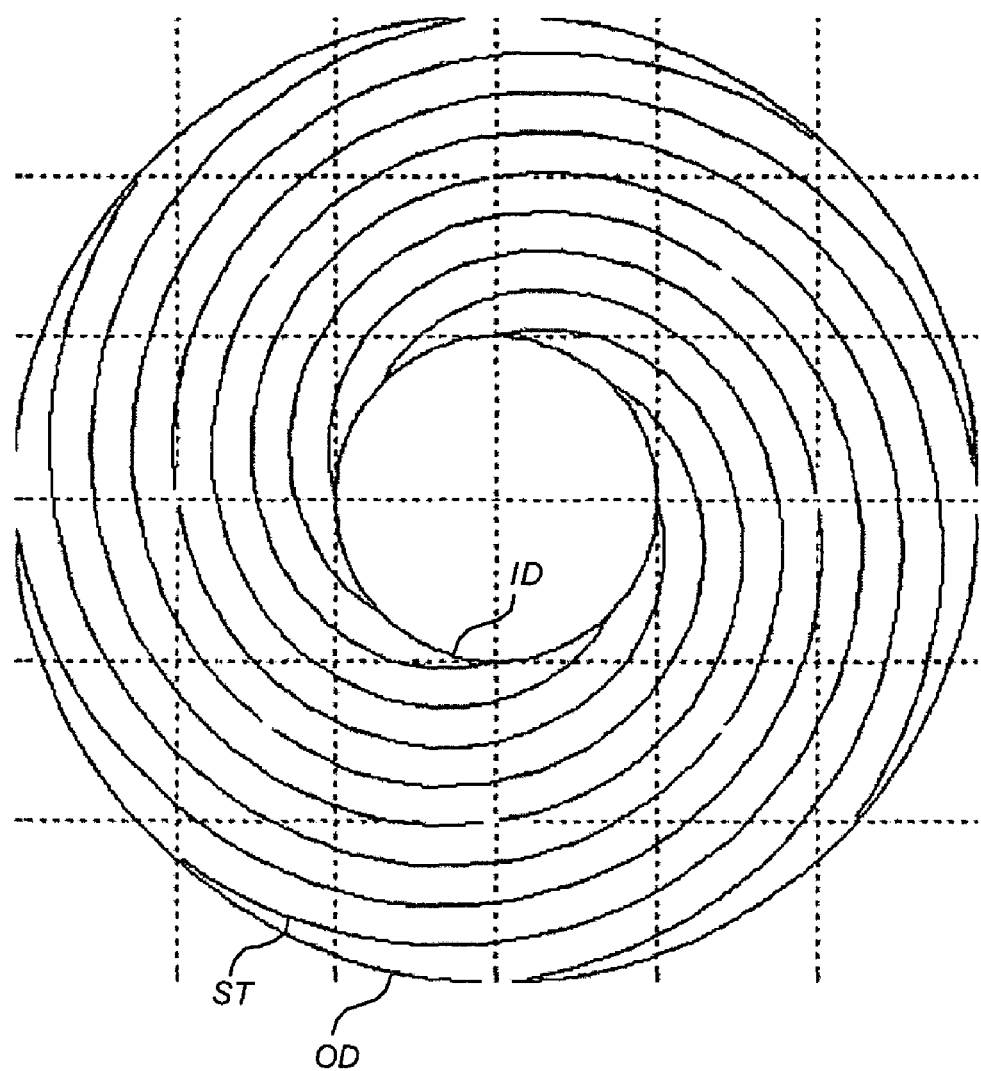
FIG. 1 shows a disk produced by one such technique, called "spiral servo."
Figure 2:
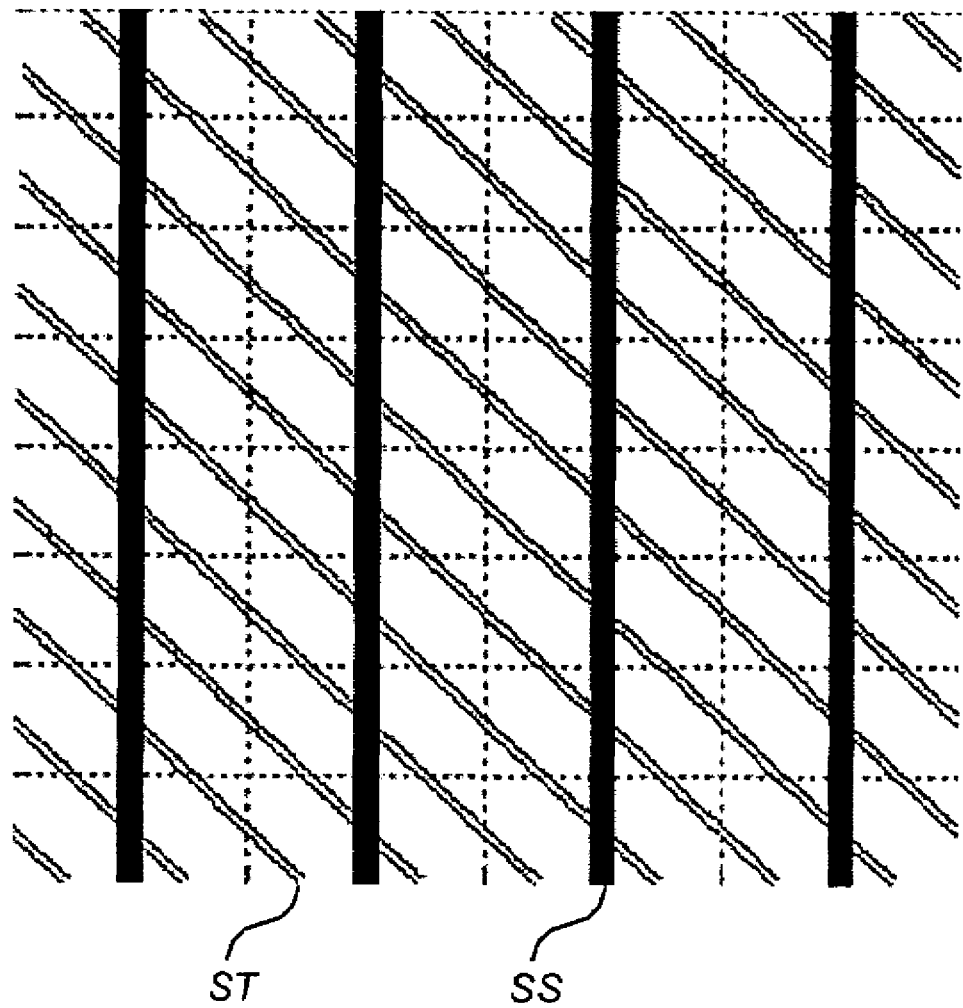
FIG. 2 shows the pattern on the disk surface after self servo writing.

The leading digit(s) of each reference numeral used in this specification indicates the number of the drawing in which the reference numeral first appears.

DETAILED DESCRIPTION

Figure 3:
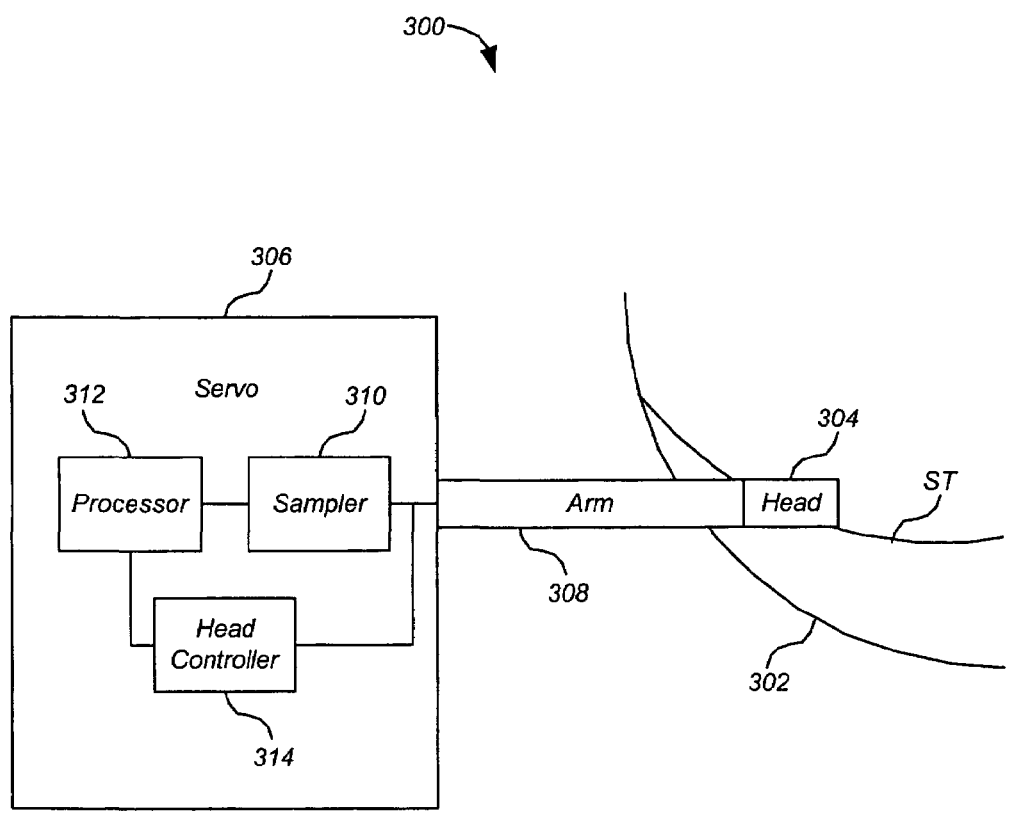
FIG. 3 shows a hard disk drive according to a preferred embodiment.
Figure 4:
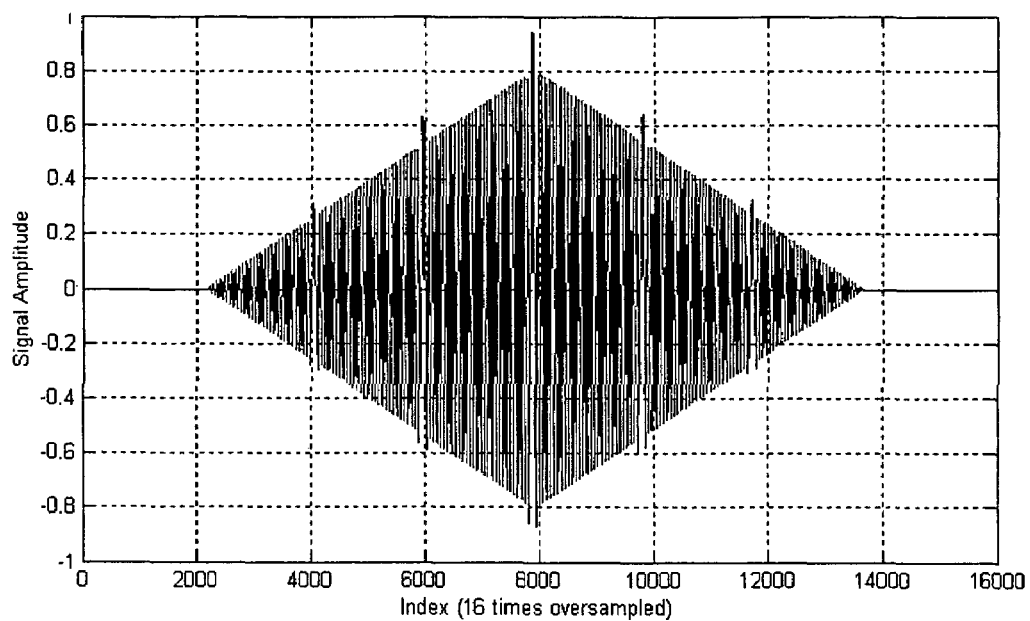
FIG. 4 shows a waveform produced as a head passes over a servo track on the disk.

FIG. 3 shows a hard disk drive 300 according to a preferred embodiment comprising a disk 302 having one or more spiral servo tracks ST written thereupon, and a head 304 connected to a servo 306 by an arm 308. Servo 306 comprises a sampler 310, a processor 312, and a head controller 314. Processor 312 can be implemented as a general-purpose processor or as a dedicated digital circuit. As head 304 passes over a servo track ST, a waveform is generated in head 304, such as the waveform depicted in FIG. 4. Because head 304 crosses each spiral servo track ST at an angle, the waveform has a diamond-shaped amplitude. Assuming that head 304 has the same width as the servo spiral track, the peak of the waveform occurs only at the moment when head 304 is completely inside the spiral servo track during an intersection. The position of head 304 with respect to disk 302 can be determined by accurately determining the location of the peak of the waveform.

Figure 5:
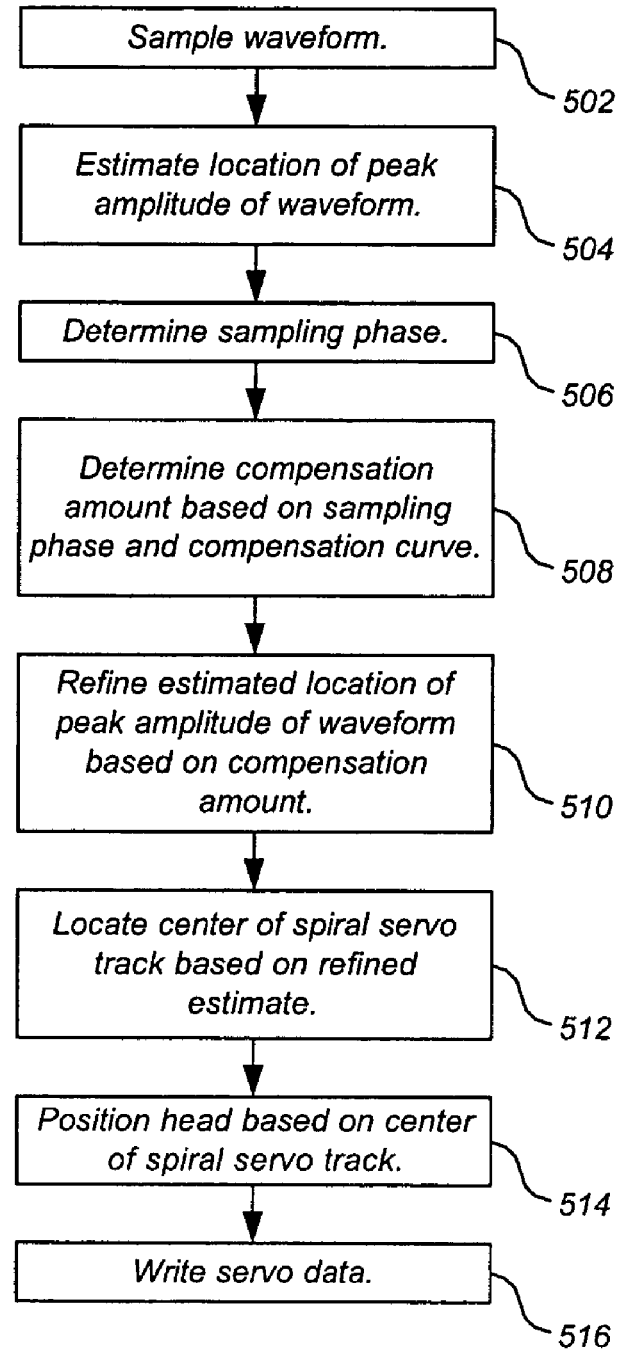
FIG. 5 is a flowchart of a process 500 for self-servo writing that can be performed by the hard disk drive of FIG. 3 according to a preferred embodiment.

FIG. 5 is a flowchart of a process 500 for self-servo writing that can be performed by hard disk drive 300 of FIG. 3 according to a preferred embodiment. Sampler 310 obtains a plurality of samples of the waveform (step 502).

The spiral servo tracks are written using a repeated pattern of channel bits that is generated using Gray-coded symbols. The symbols are coded according to the following simple rules:

symbol '1' is encoded as channel bits '0011'; and symbol '0' is encoded as channel bits '1100'.

A typical pattern consists of a certain number of consecutive '1' symbols followed by one '0' symbol. The following description considers a pattern consisting of 29 '1' symbols followed by one '0' symbol. In the present description, the '0' symbol is referred to as a "synchronization symbol." Of course, other patterns and encoding methods can be used with the present invention instead. In the present example, the length of the pattern is 30 Gray-coded symbols which collectively consist of 120 channel bits. One complete pattern is referred as one frame. A typical length of the diamond-shaped waveform is six frames, which collectively consist of 720 channel bits.

Using the samples obtained by sampler 310, processor 312 determines an estimated location of the peak amplitude of the waveform (step 504). In one embodiment this estimated location is determined according to the following conventional technique.

Because of the uncertainty of the position of the diamond-shaped waveform, the demodulation window opened by sampler 310 to sample the waveform is longer than the waveform. In the present example, for a waveform six frames long, a seven-frame window is opened. Therefore, even if the position of the waveform is off by 15 symbols (60 channel bits), the demodulation window still captures the complete diamond-shaped waveform.

Once the waveform is captured, a frame-wise demodulation is performed. The demodulation window is divided into 7 frames. Within each frame, the waveform is demodulated using a conventional approach by correlating the Baud-rate sampled waveform with two demodulation vectors: [1, 0, −1, 0, . . . ] and [0, 1, 0, −1, . . . ].

Suppose the Baud-rate sampled waveform is $$X=[x_0 \ldots x_{4N-1}] \quad (1)$$

and the two demodulation vectors are $$V_0=[1,0,-1,0, \ldots 1,0,-1,0] \quad (2)$$

and $$V_1=[0,1,0,-1, \ldots 0,1,0,-1] \quad (3)$$

where N is the number of Gray-coded symbols within each frame, and vectors $V_0$ and $V_1$ vectors are of the same length as vector X.

For each frame i, process 500 calculates the two inner products $$s_i = X \cdot V_0^T \quad (4)$$

and $$c_i = X \cdot V_1^T \quad (5)$$

and computes a demodulation value given by $$a_i = \sqrt{s_i^2 + c_i^2}. \quad (6)$$

Figure 6:
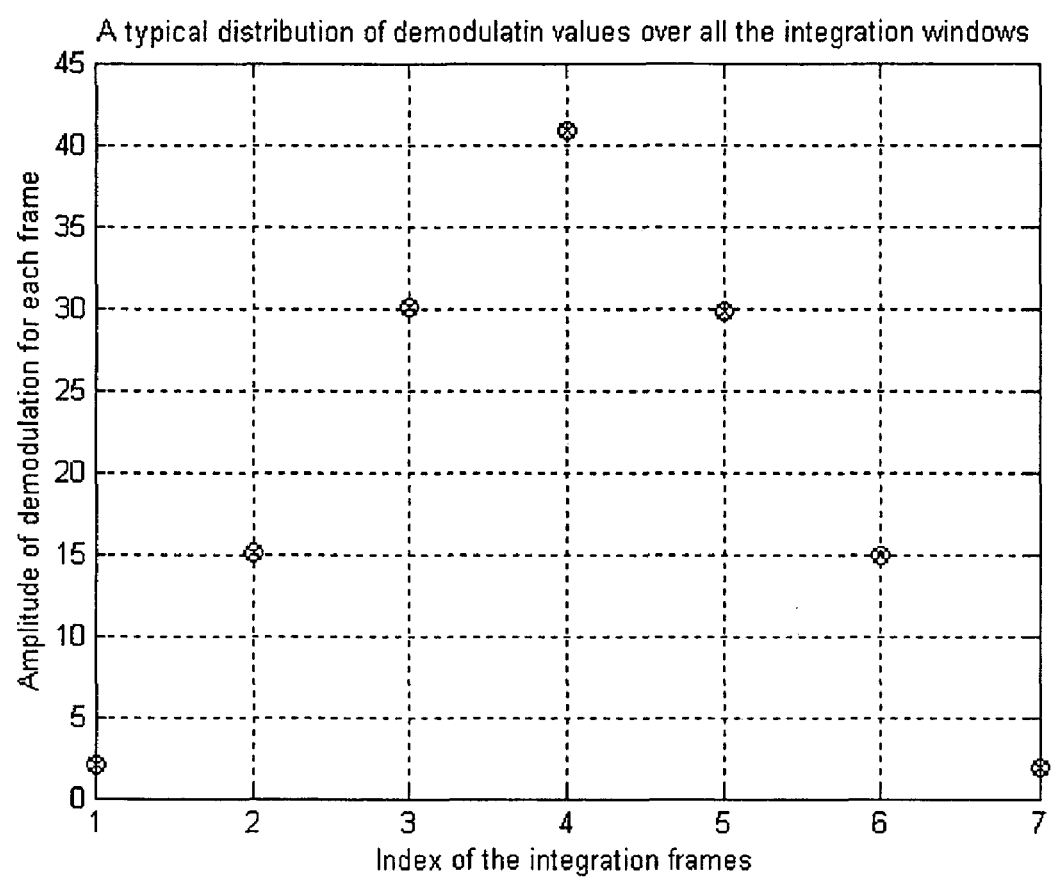
FIG. 6 shows a typical distribution of demodulation values for the waveform of FIG. 4.

Given that the center of the seven-frame demodulation window is perfectly aligned with the center of the diamond-shaped waveform, a typical distribution of the demodulation values is as shown in FIG. 6.

Figure 7:
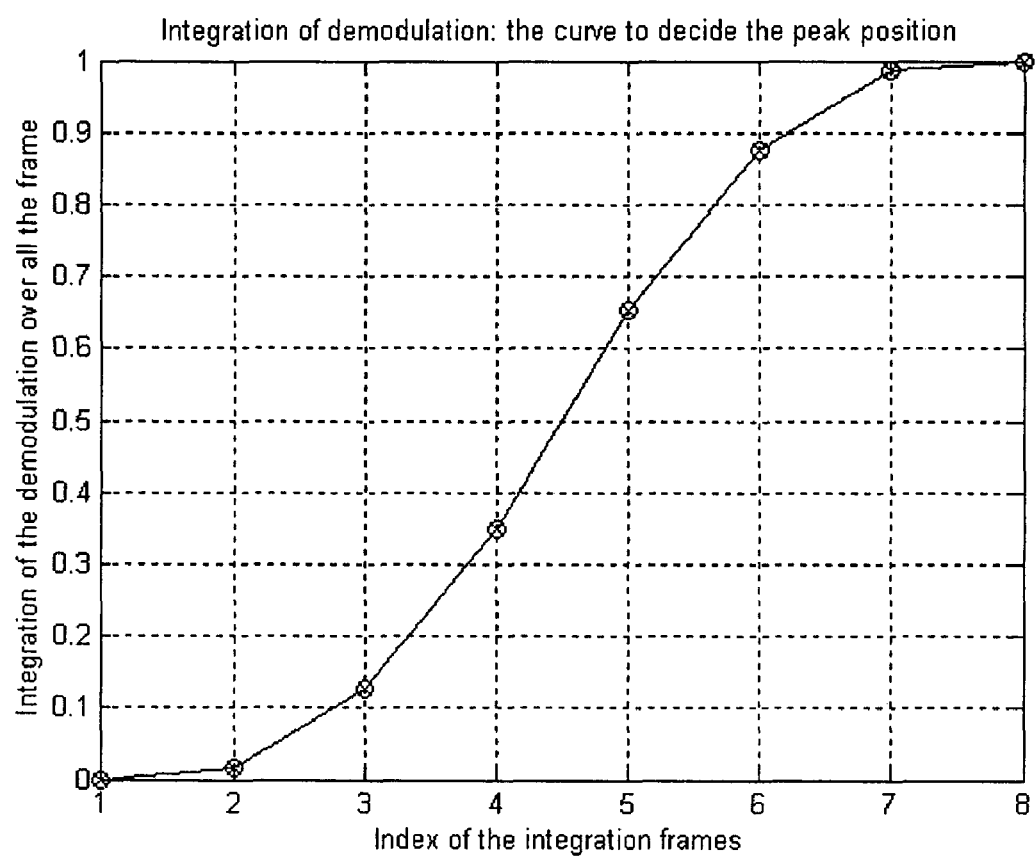
FIG. 7 shows an integration curve with the integration values normalized to one for the demodulation values of FIG. 6.

The demodulation values are integrated over the seven frames. FIG. 7 shows the integration curve with the integration values normalized to one. Using this curve, the point on the horizontal axis that corresponds to a 50-percent integration value is taken as the estimated location of the peak amplitude of the diamond-shaped waveform.

The accuracy of the above-described conventional method for determining an estimated location of the peak amplitude of the waveform is affected by the phase of the waveform. Because the head can intercept the spiral servo track at any place, a synchronization symbol can be located anywhere within a frame. This uncertainty is referred to as the sampling phase of the waveform.

To illustrate the effect of the sampling phase on accuracy, consider a 16-times over-sampled waveform having six frames of 30 Gray-coded symbols: 29 '1's and one '0'. The sampling phase can be described by the location of the synchronization symbol (here, the '0' symbol) within one of the frames. Because there is a synchronization symbol in each frame, the underlying pattern is periodic over all of the frames. Therefore, there is no need to extend the phase determination beyond one frame. The length of one frame is 120 bit cells. With an over-sampling rate of 16, there are 120×16=1920 different possible sampling phases.

Figure 8:
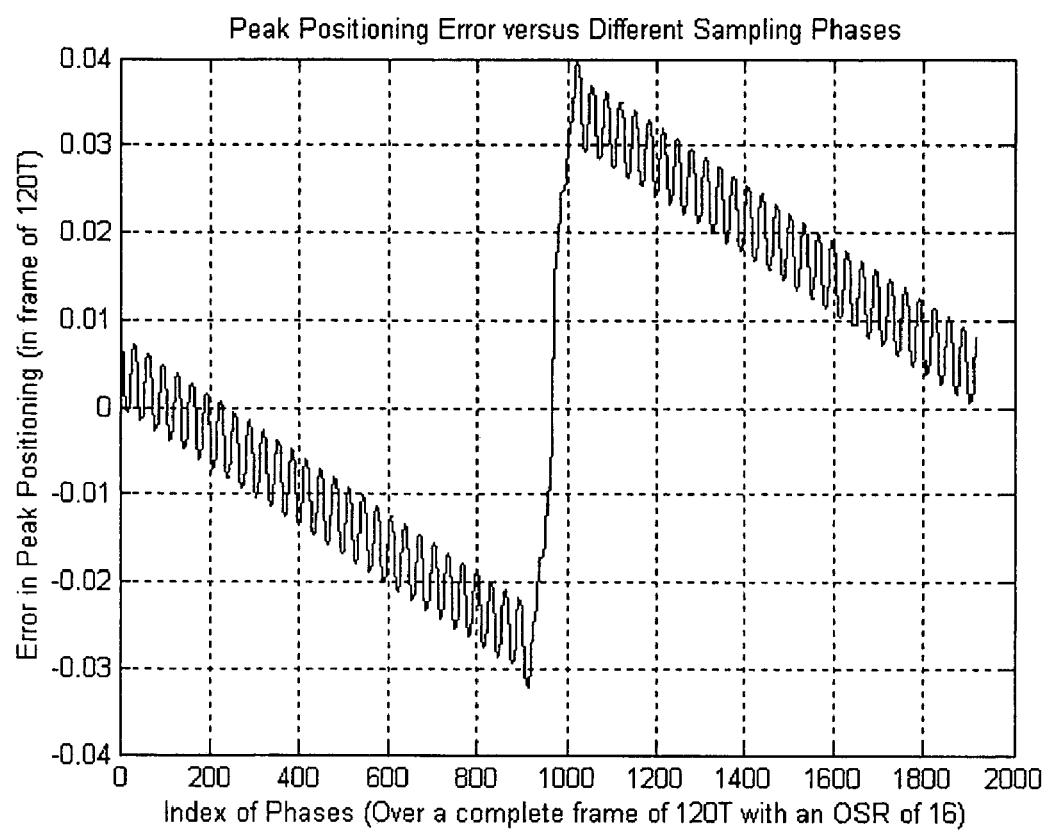
FIG. 8 shows an error curve for the waveform of FIG. 4.

Assuming no noise, and that the 6-frame waveform is perfectly centered in the 7-frame window, the error in the estimated location of the peak amplitude of the waveform versus different sampling phases can be determined. An error curve for the present example is shown in FIG. 8. As can be seen, the error has a well-defined relationship with the sampling phase. Therefore, if the sampling phase is known, then based on this curve, a certain amount of compensation can be applied so that the error in peak positioning may be greatly reduced. Because of the specific way the spiral tracks are written on the disk, the sampling phase can be obtained with resolution as good as one tenth of a clock cycle.

Note that on the curve of FIG. 8, there is a small-amplitude, high-frequency ripple superimposed on a low-frequency component. The resolution of the knowledge on sampling phase is good enough to compensate the low frequency component. But the high frequency ripple is left uncompensated.

Figure 9:
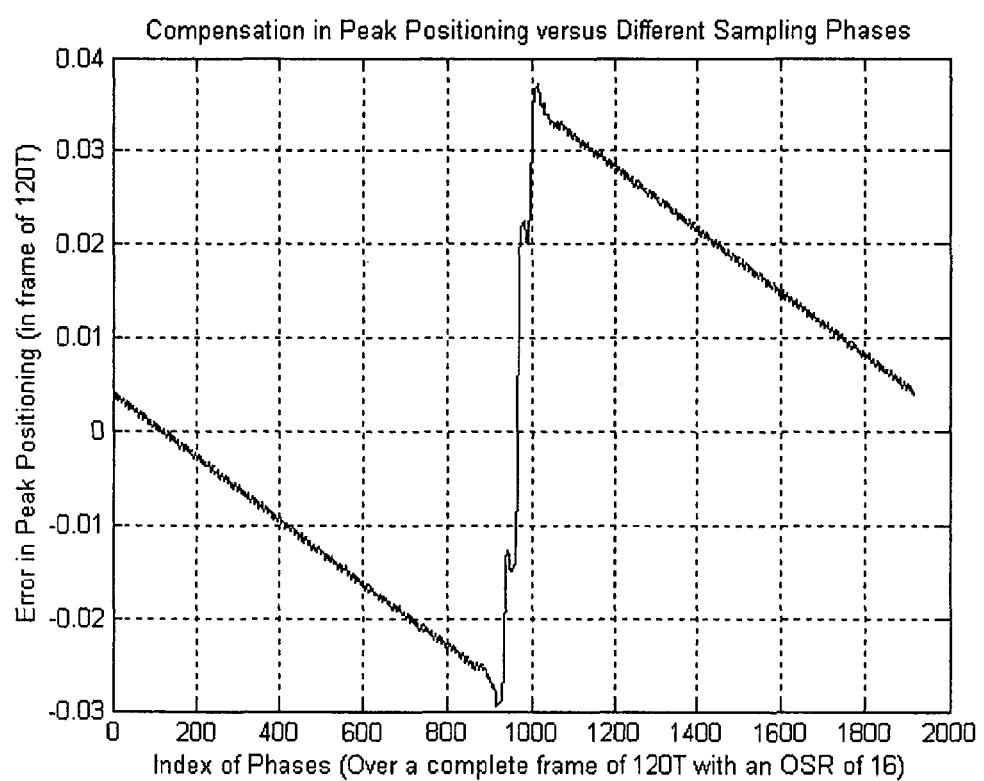
FIG. 9 shows a compensation curve for the waveform of FIG. 4.
Figure 10:
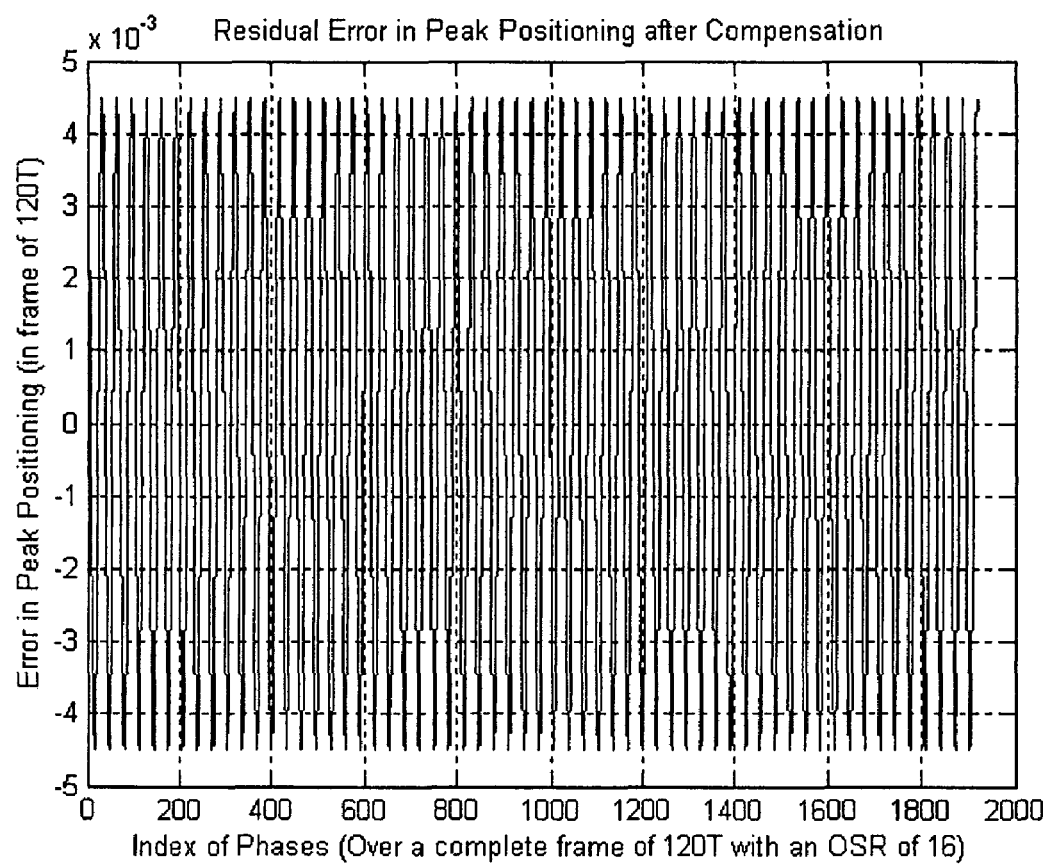
FIG. 10 shows the residual peak positioning error after compensation.

Based on the curve of FIG. 8, a compensation curve is easily generated. A compensation curve for the present example is shown in FIG. 9. After such compensation, the residual peak positioning error is shown in FIG. 10. As can be seen, residual peak positioning error is reduced by approximately a factor 10 by this compensation technique.

Processor 312 determines the sampling phase of the samples obtained by sampler 310, preferably as described above (step 506). Processor 312 then determines a compensation amount based on the sampling phase and a compensation curve such as that of FIG. 9 (step 508). Processor 312 then determines a refined estimated location of the peak amplitude of the waveform based on the estimated location of the peak amplitude of the waveform and the compensation amount (step 510), and determines the location of the center of the spiral servo track based on the refined estimated location of the peak amplitude of the waveform (step 512). In some embodiments, steps 506 through 510 are repeated one or more times to further refine the estimated location of the peak amplitude of the waveform.

Finally, head controller 314 positions head 304 over the recording medium at a location based on the determined location of the center of the spiral servo track (step 514). the purpose of this invention is not to determine the location of the center of the spiral tracks, but to determine the head's current position, both radially and circumferentially. Processor 312 determines the circumferential location of head 304 with respect to disk 302 based on the peak of the waveform, which corresponds to the center of the spiral servo track. Processor 312 then determines the radial position of head 304 with respect to disk 302 based on the identity of the spiral servo track and the circumferential location of head 304. Once the radial and circumferential position of head 304 are determined, head controller 314 can precisely move head 304 to the target positions to starting writing the conventional servo wedges there. Head 304 then writes servo data, such as the conventional servo data described above, to the recording medium (step 516).

Figure 11:
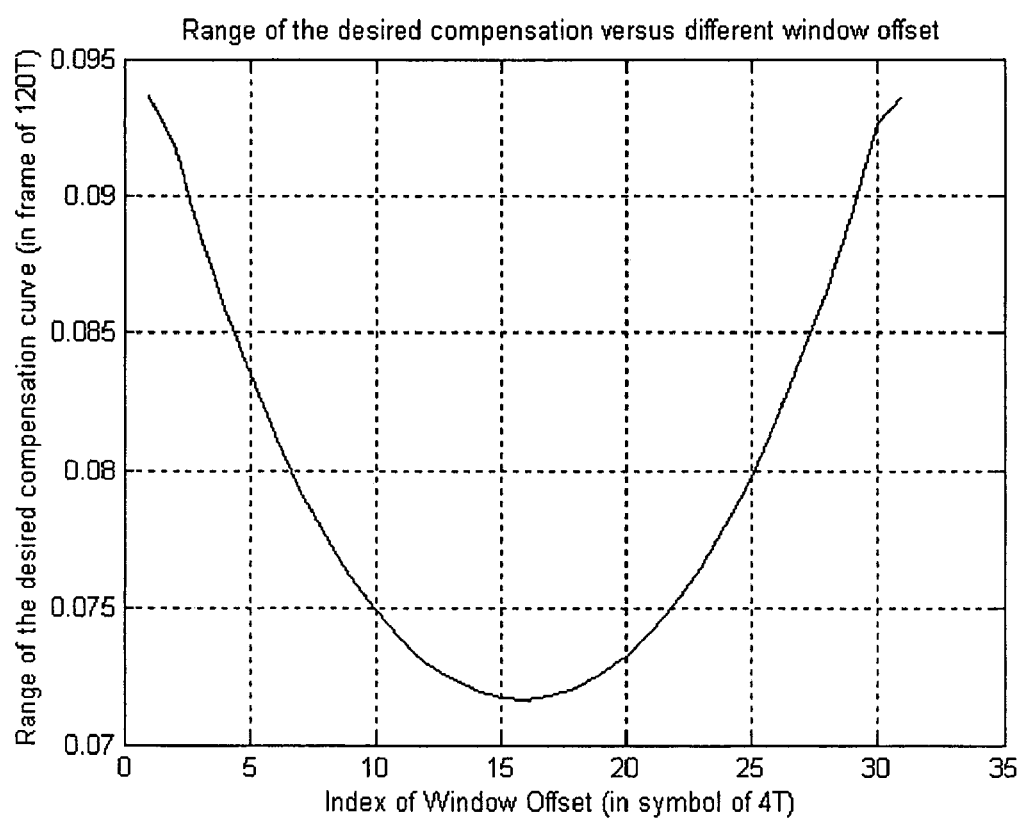
FIG. 11 shows the range of a compensation curve as a function of the window offset.
Figure 12:
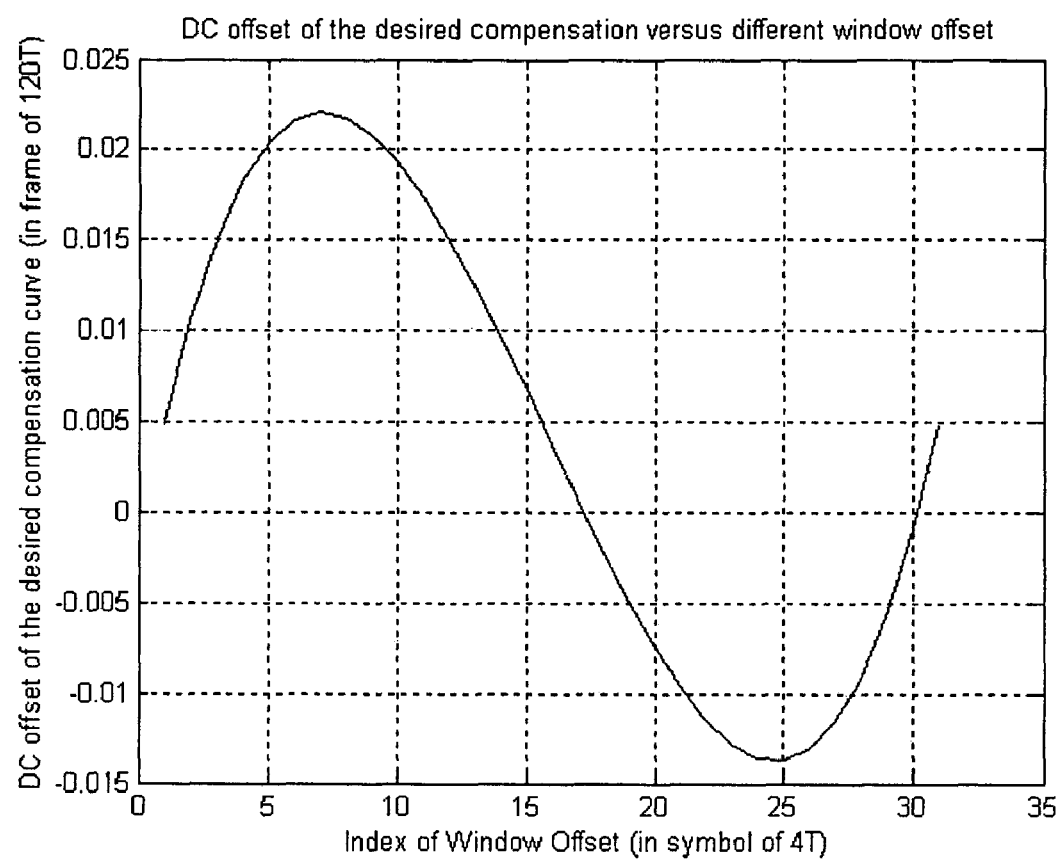
FIG. 12 shows the DC offset of a compensation curve as a function of the window offset.

Another factor that affects the accuracy of peak positioning is called "window offset." Due to the nature of the peak-locating process, the position of the waveform may not be known exactly. Therefore, the waveform may not be centered perfectly in the demodulation window. The amount by which the window is misaligned with the waveform, called the "window offset," affects the amount of compensation that should be applied to minimize the peak positioning error. In fact, both the range and the DC offset of compensation curves, such as that of FIG. 9, are functions of the window offset. But once these two parameters, range and DC offset, are determined, the compensation curve is well-defined. The range and the DC offset as functions of the window offset are shown in FIGS. 11 and 12, respectively. These two functions are also well-defined.

Some embodiments of the present invention compensate for window offset according to the following process. A plurality of compensation curves are generated using the known range and DC offsets for each window offset. These compensation curves can be stored in a memory within servo 306.

Processor 312 determines the window offset, which is the distance between the center of the seven-frame demodulation window and the center of the six-frame diamond-shaped waveform. In the first cycle of waveform processing, the center of the diamond-shaped waveform may not be known exactly. However, even this inaccurate information about the center of the waveform is useful to begin an iterative process of demodulation and compensation. With each cycle, the estimate of window offset improves, as does the subsequent compensation. The magnitude of the window offset can be defined as the number of the samples of the waveform between the estimated location of the peak amplitude of the waveform obtained in step 504 of FIG. 5 and a predetermined one of the samples, such as the center sample in the frame comprising the peak amplitude. Based on the window offset, processor 312 selects one of the stored compensation curves. The selected compensation curve is then used as the compensation curve in step 508.

Figure 13:
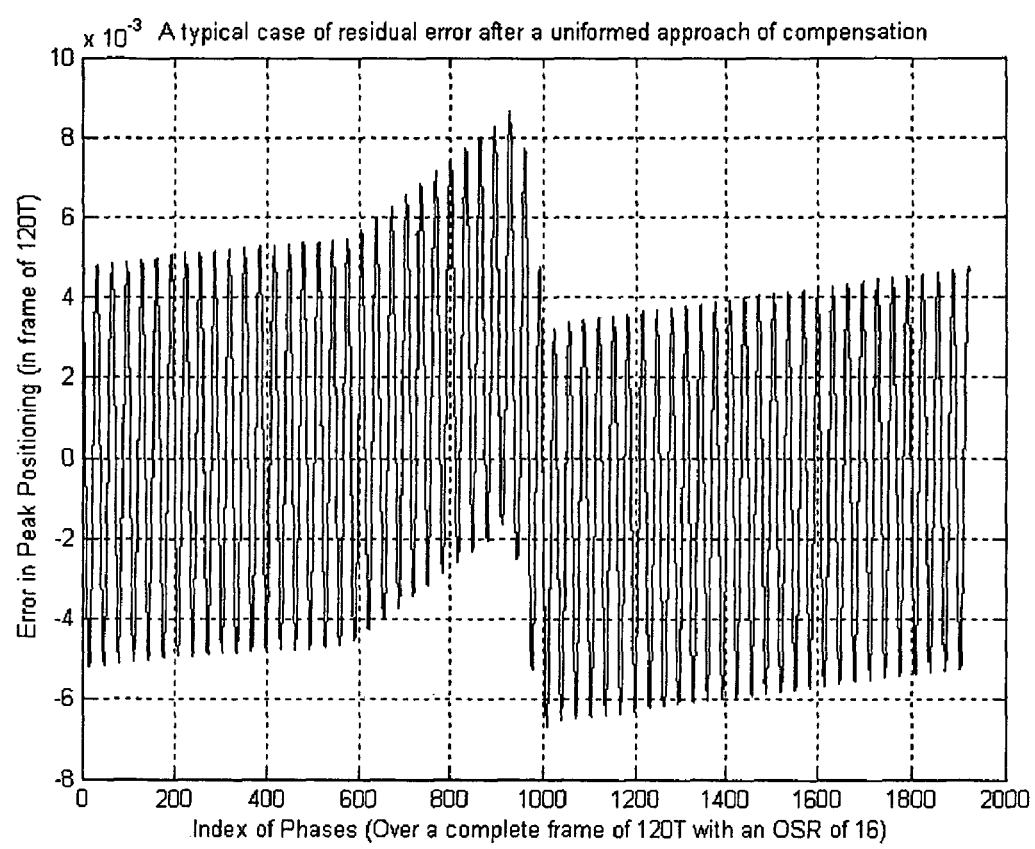
FIG. 13 shows the residual peak positioning error after compensation using window offset.

With this compensation scheme, which is uniform over all possible integration window offsets, the residual error in peak positioning is slightly increased, compared to the case of no window offset. Because this compensation scheme here works well for all possible window offset values, it greatly reduces the error even when the window offset is zero, as shown in FIG. 13.

Before compensation, the maximum position error is about 0.04 frame, or 5 clock cycles in the noiseless case. This translates into 0.7 percent of a track width in the radial position error. After the compensation described above, the peak position error is reduced to 0.006 frame, or 0.7 clock cycle. The corresponding radial position error is then about 0.1 percent, which is very acceptable.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Please list any additional modifications or variations. Accordingly, other implementations are within the scope of the following claims.

What is claimed is:

1. A hard disk drive comprising:
a hard disk having one or more spiral servo tracks written thereon, wherein each of the servo tracks comprises servo data comprising one or more synchronization symbols;
a head adapted to produce a waveform as the head moves across the servo track;
a sampler adapted to obtain a plurality of samples of the waveform, wherein the plurality of samples of the waveform comprises one of the synchronization symbols; and
a processor adapted to
determine an estimated location of a peak amplitude of the waveform with respect to the plurality of samples of the waveform,
determine a sampling phase defined by a number of the samples between one of the synchronization symbols and a predetermined one of the samples of the waveform,
determine a compensation amount based on a compensation curve and the sampling phase,
determine a refined estimated location of the peak amplitude of the waveform based on the estimated location of the peak amplitude of the waveform and the compensation amount, and
determine the location of the center of the servo track based on the refined estimated location of the peak amplitude of the waveform.

2. The apparatus of claim 1, wherein the processor is further adapted to:
determine an offset defined by a number of the samples of the waveform between the estimated location of the peak amplitude of the waveform and a second predetermined one of the samples; and
select as the compensation curve one of a plurality of candidate compensation curves based on the offset.

3. The apparatus of claim 1, wherein the sampler is further adapted to:
obtain a window of the samples of the waveform from the hard disk, wherein the window comprises n frames each comprising m of the samples of the waveform, and wherein the m samples of the waveform within at least one of the n frames comprises the one of the synchronization symbols.

4. The apparatus of claim 3, wherein the processor is further adapted to:
determine the estimated location of a peak amplitude of the waveform with respect to the window of the samples.

5. The apparatus of claim 3, wherein the processor is further adapted to:
determine a sampling phase defined by a number of the samples between the one of the synchronization symbols and the start of the one of the n frames comprising the one of the synchronization symbols.

6. The apparatus of claim 1, further comprising:
a head controller adapted to cause the head to write further servo data to the hard disk at a location based on the determined location of the center of the servo track.

7. The apparatus of claim 1, wherein the processor is further adapted to:
compute a demodulation value of the samples within each frame;
integrate the demodulation values;
select the integrated demodulation value having a value that is one-half of the value of the largest integrated demodulation value;
select the sample corresponding to the selected integrated demodulation value; and
determine the estimated location of a peak amplitude of the waveform based on the selected sample.

8. A hard disk drive comprising:
hard disk means for storing data, the hard disk means having one or more spiral servo tracks written thereon, wherein each of the servo tracks comprises servo data comprising one or more synchronization symbols;
head means for producing a waveform as the head moves across the servo track;
sampler means for obtaining a plurality of samples of the waveform, wherein the plurality of samples of the waveform comprises one of the synchronization symbols; and
processor means for
determining an estimated location of a peak amplitude of the waveform with respect to the plurality of samples of the waveform,
determining a sampling phase defined by a number of the samples between one of the synchronization symbols and a predetermined one of the samples of the waveform,
determining a compensation amount based on a compensation curve and the sampling phase,
determining a refined estimated location of the peak amplitude of the waveform based on the estimated location of the peak amplitude of the waveform and the compensation amount, and
determining the location of the center of the servo track based on the refined estimated location of the peak amplitude of the waveform.

9. The apparatus of claim 8, wherein the processor means:
determines an offset defined by a number of the samples of the waveform between the estimated location of the peak amplitude of the waveform and a second predetermined one of the samples; and
selects as the compensation curve one of a plurality of candidate compensation curves based on the offset.

10. The apparatus of claim 8, wherein the sampler means:
obtains a window of the samples of the waveform from the hard disk, wherein the window comprises n frames each comprising m of the samples of the waveform, and wherein the m samples of the waveform within at least one of the n frames comprises the one of the synchronization symbols.

11. The apparatus of claim 10, wherein the processor means:
determines the estimated location of a peak amplitude of the waveform with respect to the window of the samples.

12. The apparatus of claim 10, wherein the processor means:
determines a sampling phase defined by a number of the samples between the one of the synchronization symbols and the start of the one of the n frames comprising the one of the synchronization symbols.

13. The apparatus of claim 8, further comprising:
head controller means for causing the head to write further servo data to the hard disk at a location based on the determined location of the center of the servo track.

14. The apparatus of claim 8, wherein the processor means:
computes a demodulation value of the samples within each frame;
integrates the demodulation values;
selects the integrated demodulation value having a value that is one-half of the value of the largest integrated demodulation value;
selects the sample corresponding to the selected integrated demodulation value; and
determines the estimated location of a peak amplitude of the waveform based on the selected sample.

15. An apparatus for determining the location of the center of a servo track embodied in a recording medium, wherein the servo track comprises servo data comprising one or more synchronization symbols, the apparatus comprising:
a sampler adapted to obtain a plurality of samples of a waveform produced as a head moves across the servo track, wherein the plurality of samples of the waveform comprises one of the synchronization symbols; and
a processor adapted to
determine an estimated location of a peak amplitude of the waveform with respect to the plurality of samples of the waveform,
determine a sampling phase defined by a number of the samples between one of the synchronization symbols and a predetermined one of the samples of the waveform,
determine a compensation amount based on a compensation curve and the sampling phase,
determine a refined estimated location of the peak amplitude of the waveform based on the estimated location of the peak amplitude of the waveform and the compensation amount, and
determine the location of the center of the servo track based on the refined estimated location of the peak amplitude of the waveform.

16. The apparatus of claim 15, wherein the processor is further adapted to:
determine an offset defined by a number of the samples of the waveform between the estimated location of the peak amplitude of the waveform and a second predetermined one of the samples; and
select as the compensation curve one of a plurality of candidate compensation curves based on the offset.

17. The apparatus of claim 15, wherein the sampler is further adapted to:
obtain a window of the samples of the waveform from the recording medium, wherein the window comprises n frames each comprising m of the samples of the waveform, and wherein the m samples of the waveform within at least one of the n frames comprises the one of the synchronization symbols.

18. The apparatus of claim 17, wherein the processor is further adapted to:
determine the estimated location of a peak amplitude of the waveform with respect to the window of the samples.

19. The apparatus of claim 17, wherein the processor is further adapted to:
determine a sampling phase defined by a number of the samples between the one of the synchronization symbols and the start of the one of the n frames comprising the one of the synchronization symbols.

20. The apparatus of claim 15, further comprising:
a head controller adapted to cause the head to write further servo data to the recording medium at a location based on the determined location of the center of the servo track.

21. The apparatus of claim 15, wherein the processor is further adapted to:
compute a demodulation value of the samples within each frame;
integrate the demodulation values;
select the integrated demodulation value having a value that is one-half of the value of the largest integrated demodulation value;
select the sample corresponding to the selected integrated demodulation value; and
determine the estimated location of a peak amplitude of the waveform based on the selected sample.

22. An apparatus for determining the location of the center of a servo track embodied in a recording medium, wherein the servo track comprises servo data comprising one or more synchronization symbols, the apparatus comprising:
sampler means for obtaining a plurality of samples of a waveform produced as a head moves across the servo track, wherein the plurality of samples of the waveform comprises one of the synchronization symbols; and
processor means for
determining an estimated location of a peak amplitude of the waveform with respect to the plurality of samples of the waveform,
determining a sampling phase defined by a number of the samples between one of the synchronization symbols and a predetermined one of the samples of the waveform,
determining a compensation amount based on a compensation curve and the sampling phase,
determining a refined estimated location of the peak amplitude of the waveform based on the estimated location of the peak amplitude of the waveform and the compensation amount, and
determining the location of the center of the servo track based on the refined estimated location of the peak amplitude of the waveform.

23. The apparatus of claim 22, wherein the processor means:
determines an offset defined by a number of the samples of the waveform between the estimated location of the peak amplitude of the waveform and a second predetermined one of the samples; and
selects as the compensation curve one of a plurality of candidate compensation curves based on the offset.

24. The apparatus of claim 22, wherein the sampler means:
obtains a window of the samples of the waveform from the recording medium, wherein the window comprises n frames each comprising m of the samples of the waveform, and wherein the m samples of the waveform within at least one of the n frames comprises the one of the synchronization symbols.

25. The apparatus of claim 24, wherein the processor means:
determines the estimated location of a peak amplitude of the waveform with respect to the window of the samples.

26. The apparatus of claim 24, wherein the processor means:
   determines a sampling phase defined by a number of the samples between the one of the synchronization symbols and the start of the one of the n frames comprising the one of the synchronization symbols.

27. The apparatus of claim 22, further comprising:
   head controller means for causing the head to write further servo data to the recording medium at a location based on the determined location of the center of the servo track.

28. The apparatus of claim 22, wherein the processor means:
   computes a demodulation value of the samples within each frame;
   integrates the demodulation values;
   selects the integrated demodulation value having a value that is one-half of the value of the largest integrated demodulation value;
   selects the sample corresponding to the selected integrated demodulation value; and
   determines the estimated location of a peak amplitude of the waveform based on the selected sample.

29. A method for determining the location of the center of a servo track embodied in a recording medium, wherein the servo track comprises servo data comprising one or more synchronization symbols, and wherein a waveform is produced in a head as the head moves across the servo track, the method comprising:
   obtaining a plurality of samples of the waveform, wherein the plurality of samples of the waveform comprises one of the synchronization symbols;
   determining an estimated location of a peak amplitude of the waveform with respect to the plurality of samples of the waveform;
   determining a sampling phase defined by a number of the samples between one of the synchronization symbols and a predetermined one of the samples of the waveform;
   determining a compensation amount based on a compensation curve and the sampling phase;
   determining a refined estimated location of the peak amplitude of the waveform based on the estimated location of the peak amplitude of the waveform and the compensation amount; and
   determining the location of the center of the servo track based on the refined estimated location of the peak amplitude of the waveform.

30. The method of claim 29, further comprising:
   determining an offset defined by a number of the samples of the waveform between the estimated location of the peak amplitude of the waveform and a second predetermined one of the samples; and
   selecting as the compensation curve one of a plurality of candidate compensation curves based on the offset.

31. The method of claim 29, wherein obtaining a plurality of samples of the waveform comprises:
   obtaining a window of the samples of the waveform from the recording medium, wherein the window comprises n frames each comprising m of the samples of the waveform, and wherein the m samples of the waveform within at least one of the n frames comprises the one of the synchronization symbols.

32. The method of claim 31, wherein determining an estimated location of a peak amplitude of the waveform comprises:
   determining the estimated location of a peak amplitude of the waveform with respect to the window of the samples.

33. The method of claim 31, wherein determining a sampling phase comprises:
   determining a sampling phase defined by a number of the samples between the one of the synchronization symbols and the start of the one of the n frames comprising the one of the synchronization symbols.

34. The method of claim 29, further comprising:
   writing further servo data to the recording medium at a location based on the determined location of the center of the servo track.

35. The method of claim 29, wherein determining an estimated location of the peak amplitude of the waveform comprises:
   computing a demodulation value of the samples within each frame;
   integrating the demodulation values;
   selecting the integrated demodulation value having a value that is one-half of the value of the largest integrated demodulation value;
   selecting the sample corresponding to the selected integrated demodulation value; and
   determining the estimated location of a peak amplitude of the waveform based on the selected sample.

36. A computer program embodied in a computer-readable recording medium embodying instructions executable by a computer for determining the location of the center of a servo track, wherein the servo track comprises servo data comprising one or more synchronization symbols, and wherein a waveform is produced in a head as the head moves across the servo track, the computer program comprising:
   determining an estimated location of a peak amplitude of the waveform with respect to a plurality of samples of the waveform, wherein the plurality of samples of the waveform comprises one of the synchronization symbols;
   determining a sampling phase defined by a number of the samples between one of the synchronization symbols and a predetermined one of the samples of the waveform;
   determining a compensation amount based on a compensation curve and the sampling phase;
   determining a refined estimated location of the peak amplitude of the waveform based on the estimated location of the peak amplitude of the waveform and the compensation amount; and
   determining the location of the center of the servo track based on the refined estimated location of the peak amplitude of the waveform.

37. The computer program of claim 36, wherein the method further comprises:
   determining an offset defined by a number of the samples of the waveform between the estimated location of the peak amplitude of the waveform and a second predetermined one of the samples; and
   selecting as the compensation curve one of a plurality of candidate compensation curves based on the offset.

38. The computer program of claim 36, further comprising:
   obtaining a window of the samples of the waveform from the recording medium, wherein the window comprises n frames each comprising m of the samples of the waveform, and wherein the m samples of the waveform within at least one of the n frames comprises the one of the synchronization symbols.

39. The computer program of claim 38, wherein determining an estimated location of a peak amplitude of the waveform comprises:
 determining the estimated location of a peak amplitude of the waveform with respect to the window of the samples.

40. The computer program of claim 38, wherein determining a sampling phase comprises:
 determining a sampling phase defined by a number of the samples between the one of the synchronization symbols and the start of the one of the n frames comprising the one of the synchronization symbols.

41. The computer program of claim 36, wherein the method further comprises:
 writing further servo data to the recording medium at a location based on the determined location of the center of the servo track.

42. The computer program of claim 36, wherein determining an estimated location of the peak amplitude of the waveform comprises:
 computing a demodulation value of the samples within each frame;
 integrating the demodulation values;
 selecting the integrated demodulation value having a value that is one-half of the value of the largest integrated demodulation value;
 selecting the sample corresponding to the selected integrated demodulation value; and
 determining the estimated location of a peak amplitude of the waveform based on the selected sample.

* * * * *

UNITED STATES PATENT AND TRADEMARK OFFICE
CERTIFICATE OF CORRECTION

PATENT NO.         : 7,002,761 B1                                                   Page 1 of 1
APPLICATION NO. : 10/644166
DATED              : February 21, 2006
INVENTOR(S)        : Sutardja et al.

It is certified that error appears in the above-identified patent and that said Letters Patent is hereby corrected as shown below:

Column 7, Line 35:   Delete "the" and insert -- The --
Column 14, Claim 36, Line 28:   Delete "embodying instructions" after "medium"

Signed and Sealed this

Twenty-sixth Day of September, 2006

JON W. DUDAS
*Director of the United States Patent and Trademark Office*